(12) United States Patent
Narita et al.

(10) Patent No.: US 11,120,951 B2
(45) Date of Patent: Sep. 14, 2021

(54) ELECTRODE FOIL, WINDING CAPACITOR, ELECTRODE FOIL MANUFACTURING METHOD, AND WINDING CAPACITOR MANUFACTURING METHOD

(71) Applicant: Nippon Chemi-Con Corporation, Tokyo (JP)

(72) Inventors: Yoshiyuki Narita, Tokyo (JP); Kazuhiro Nagahara, Tokyo (JP); Atsushi Tanaka, Tokyo (JP); Shoji Ono, Tokyo (JP)

(73) Assignee: Nippon Chemi-Con Corporation, Tokyo (JP)

( * ) Notice: Subject to any disclaimer, the term of this patent is extended or adjusted under 35 U.S.C. 154(b) by 13 days.

(21) Appl. No.: 16/492,144

(22) PCT Filed: Mar. 28, 2018

(86) PCT No.: PCT/JP2018/012788
§ 371 (c)(1),
(2) Date: Sep. 8, 2019

(87) PCT Pub. No.: WO2018/181485
PCT Pub. Date: Oct. 4, 2018

(65) Prior Publication Data
US 2020/0388443 A1    Dec. 10, 2020

(30) Foreign Application Priority Data
Mar. 31, 2017    (JP) .............................. JP2017-072127

(51) Int. Cl.
*H01G 11/04*    (2013.01)
*H01G 11/24*    (2013.01)
*H01G 11/86*    (2013.01)

(52) U.S. Cl.
CPC .............. *H01G 11/04* (2013.01); *H01G 11/24* (2013.01); *H01G 11/86* (2013.01)

(58) Field of Classification Search
None
See application file for complete search history.

(56) References Cited

U.S. PATENT DOCUMENTS 5,968,210 A * 10/1999 Strange .................. H01G 9/055
29/25.03
6,426,864 B1 * 7/2002 O'Phelan ............... H01G 9/055
361/509
(Continued)

FOREIGN PATENT DOCUMENTS

| CN | 106001111 A | 10/2016 |
| CN | 108431916 A | 8/2018 |

(Continued)

OTHER PUBLICATIONS

International Search Report from International Patent Application No. PCT/JP2018/012788, dated Jun. 12, 2018.
(Continued)

*Primary Examiner* — Dion Ferguson
(74) *Attorney, Agent, or Firm* — SGPatents PLLC

(57) ABSTRACT

An electrode foil that progresses an enlargement of the surface area of a dielectric film and that barely causes cracks at the time of winding, a winding capacitor obtained by winding the electrode foil, an electrode foil manufacturing method, and a winding capacitor manufacturing method are provided. An electrode foil 1 is formed of a belt-like foil, and has a surface enlarged part 3, a core part 2, and a plurality of separation parts 4. The surface enlarged part 3 is formed on the surface of the foil, and the core part 2 is a part remained when excluding the surface enlarged part 3 within the foil. The separation part 4 extends on the surface enlarged part 3, dividing the surface enlarged part 3. The
(Continued)

plurality of separation parts 4 share bending stress when the electrode foil 1 is wound, preventing concentration of stress.

10 Claims, 8 Drawing Sheets

(56) References Cited

U.S. PATENT DOCUMENTS

| | | | |
|---|---|---|---|
| 6,621,686 B1 * | 9/2003 | Jenn-Feng | A61N 1/3956 |
| | | | 361/503 |
| 6,736,956 B1 | 5/2004 | Hemphill et al. | |
| 7,256,983 B2 * | 8/2007 | Ozawa | H01G 9/008 |
| | | | 361/518 |
| 9,536,674 B2 * | 1/2017 | Takeuchi | H01G 9/042 |
| 9,536,675 B2 * | 1/2017 | Machida | H01G 9/145 |
| 2006/0180474 A1 * | 8/2006 | Fujimoto | H01G 9/055 |
| | | | 205/213 |
| 2012/0268073 A1 * | 10/2012 | Morioka | H01M 4/70 |
| | | | 320/128 |
| 2018/0315552 A1 * | 11/2018 | Narita | H01G 9/0032 |
| 2020/0168406 A1 * | 5/2020 | Yoshida | H01G 9/008 |

FOREIGN PATENT DOCUMENTS

| | | | | |
|---|---|---|---|---|
| EP | 3385968 A1 | 10/2018 | | |
| JP | 2007-149759 A | 6/2007 | | |
| JP | 2009-062595 A | 3/2009 | | |
| JP | 2013-153024 A | 8/2013 | | |
| JP | 2014-135481 A | 7/2014 | | |
| WO | WO2017/171028 | * 10/2017 | | H01G 9/055 |

OTHER PUBLICATIONS

Extended European Search Report and European Search Opinion dated May 13, 2020, in European Patent Application No. 18777297.5.

Office Action dated Dec. 3, 2020, in Chinese Patent Application No. 201880020966.8.

* cited by examiner (a)

(b)

ELECTRODE FOIL, WINDING CAPACITOR, ELECTRODE FOIL MANUFACTURING METHOD, AND WINDING CAPACITOR MANUFACTURING METHOD

TECHNICAL FIELD

The present disclosure relates to an electrode foil used for a wounding capacitor.

BACKGROUND ART

Electrolytic capacitors, in which a gap is filled with an electrolyte in order to closely contact a dielectric film of a positive electrode with an opposing electrode, include a non-solid electrolytic capacitor in which an electrolyte is a liquid, a solid electrolytic capacitor in which an electrolyte is a solid, a hybrid type electrolytic capacitor in which an electrolyte is in a liquid and in a solid, and a bipolar electrolytic capacitor in which a dielectric film is formed on both electrodes. An electrolytic capacitor is formed by impregnating a capacitor element in an electrolyte, the capacitor element has a configuration in which a positive electrode foil in which a dielectric film is formed on a valve metal foil, such as aluminum, and a negative electrode foil which is made of a metal foil of the same metal or a different metal are positioned to face each other, and a separator is interposed between the positive electrode foil and the negative electrode foil.

The electrostatic capacitance of an electrolytic capacitor is proportional to a surface area of the dielectric film. In general, a surface enlargement process, such as etching, is performed on the electrode foil of an electrolytic capacitor, and a chemical treatment is performed on the surface enlarged part, which was subjected to the enlargement process, to have a dielectric film with a large surface area. In recent years, in order to further increase the electrostatic capacitance of an electrolytic capacitor, enlargement has progressed from the surface of the electrode foil to a deeper part.

In other words, in an electrolytic capacitor, a core part of the electrode foil is tending to be thinner. The surface enlarged part having the dielectric film has flexibility and stretchability lower than the core part. Therefore, an electrode foil that had the surface enlargement of the dielectric film has decreased flexibility and stretchability due to thinning of the residual core part having high flexibility and stretchability.

Here, as an electrolytic capacitor using the electrode foil, a form of a winding capacitor may be used in order to reduce the size and to increase a capacitance. The capacitor element of a winding capacitor is obtained by laminating the positive electrode foil and the negative electrode foil with a separator therebetween and winding them in a cylindrical form. In recent years, steps for increasing a surface area of a dielectric film have caused big problems with respect to winding properties of a winding capacitor.

That is, when surface enlarged part, which surface enlargement was performed to, is chemically treated to form a dielectric film, the flexibility and stretchability of an electrode foil decrease. Accordingly, the electrode foil may not be able to be deformed into a bow, then, many fine cracks are generated. Due to the generation of these fine cracks, unoxidized metal part is exposed on inner surface of the cracks.

Here, in the winding capacitor, the aging treatment is performed before, for the electrolytic capacitor, the capacitor element is impregnated with the electrolytic solution, and before, for the solid electrolytic capacitor, the electrolyte is formed. When the aging treatment is performed in the condition the unoxidized metal part being exposed, the time required for aging will be prolonged.

CITATION LIST

Patent Literatures

Patent Document 1: JP 2007-149759 A

SUMMARY OF INVENTION

Technical Problem

In order to solve the problems in the conventional art as described above, the present disclosure provides an electrode foil which the enlargement of a surface of a dielectric film is progressed and which the cracks at the time of winding is difficult to occur, a winding capacitor which the electrode foil is wound, an electrode foil manufacturing method, and a winding capacitor manufacturing method.

Solution to Problem

In order to achieve the above objective, an electrode foil according to the present disclosure is formed of a belt-like foil, and includes surface enlarged parts that are formed on a surface of the foil and are formed of a plurality of tunnel-shaped pits; a core part which is a remaining part excluding the surface enlarged parts within the foil; a plurality of separation parts that extends discontinuously on the surface enlarged parts and divides the surface enlarged parts; and a dielectric film formed on surfaces of the surface enlarged part or on surfaces of the surface enlarged part and the separation parts.

The separation parts may be formed to connect or stride at least the plurality of the tunnel-shaped pits.

The separation parts may have a groove width of 0 to 50 μm in the condition the foil is flat.

A part of pits among the plurality of the tunnel-shaped pits may penetrate the core part.

A winding capacitor including the electrode foil that is wound thereon is an aspect of the present disclosure.

The winding capacitor includes a capacitor element obtained by winding the electrode foil, and the capacitor element may include a winding core part at a winding center, the electrode foil may be wound around the winding core part, and the separation parts may be formed at least on within a predetermined radius of a winding center-side including a start of the winding to the winding core part.

In addition, in order to achieve the above objective, an electrode foil manufacturing method according to the present disclosure includes a step of forming surface enlarged parts formed of a plurality of tunnel-shaped pits on a surface of a belt-like foil; and a step of extending a plurality of separation parts that divide the surface enlarged parts discontinuously on the foil; and a step of performing a chemical treatment for the foil to form a dielectric film on surfaces of the surface enlarged part or on surfaces of the surface enlarged part and the separation parts.

The chemical treatment may be performed for the foil after forming the separation parts.

The chemical treatment may be performed for the foil after forming the surface enlarged parts and before forming the separation parts.

The method may further include a step of performing the chemical treatment for the foil after the forming of the surface enlarged parts and before the forming of the separation parts, and performing a chemical treatment again for the foil after forming of the separation parts.

In addition, in order to achieve the above objective, the winding capacitor manufacturing method according to the present disclosure includes an element forming step of forming a capacitor element by winding the foil, an electrolyte forming step of forming an electrolyte on the capacitor element; and an aging step of aging the capacitor element, in which the aging step is performed after the electrolyte is formed in the electrolyte forming step, or the electrolyte is formed in the aged capacitor element in the electrolyte forming step after the aging step.

Advantageous Effects of Invention

According to the present disclosure, since the separation parts disperses the bending stress during the winding, cracks that may expose the unoxidized metal part during the winding are unlikely to occur, a quantity of electricity required for the aging treatment decreases and the time required for the aging treatment is shortened.

DESCRIPTION OF EMBODIMENTS

An electrode foil and a winding capacitor according to embodiments of the present disclosure will be described below in detail. It should be noted that the present disclosure is not limited to the embodiments described below.

Electrode Foil

Figure 1:
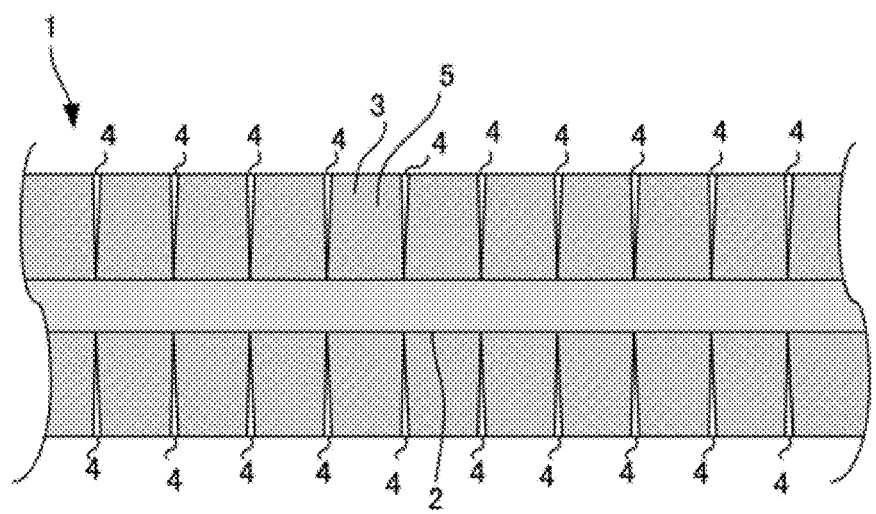
FIG. 1 shows a structure of an electrode foil according to the present embodiment, and (a) is a cross sectional view in a longitudinal direction and (b) is a top view.
Figure 1:
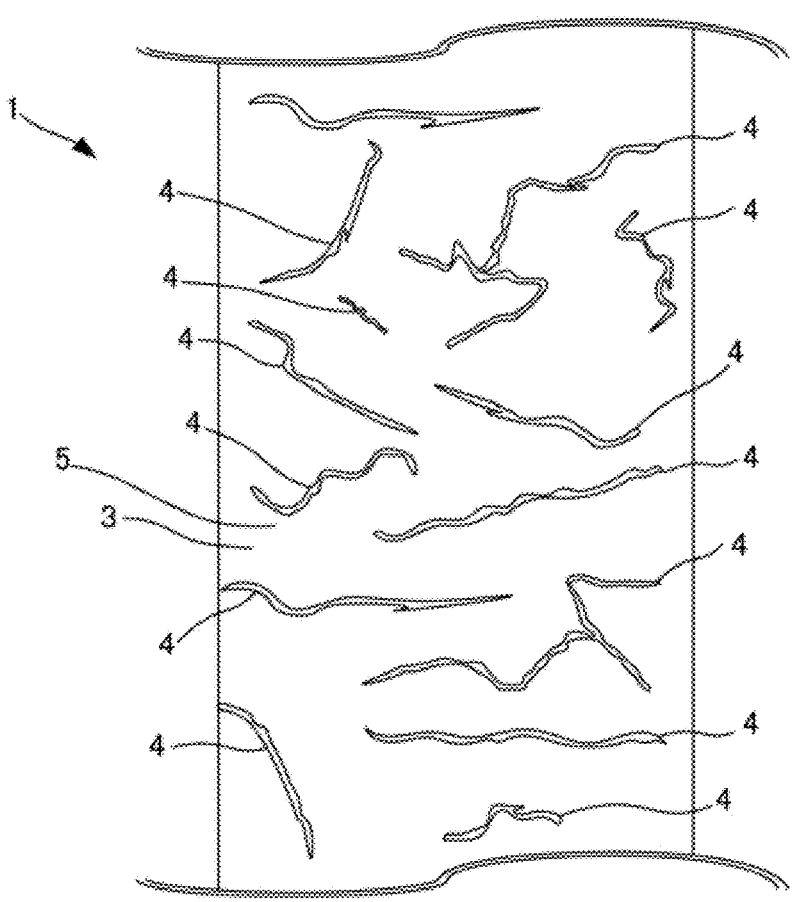

An electrode foil 1 shown in FIG. 1 is used for either or both a positive electrode foil of a winding capacitor and a negative electrode foil on which a dielectric film 5 is formed. A representative example of a winding capacitor is an electrolytic capacitor. As examples of the electrolytic capacitor, a non-solid electrolytic capacitor in which an electrolyte is a liquid and a dielectric film is formed on the positive electrode foil, a solid electrolytic capacitor in which an electrolyte is a solid and a dielectric film is formed on the positive electrode foil, a hybrid type electrolytic capacitor in which a liquid and a solid are included as an electrolyte, and a bipolar electrolytic capacitor in which a dielectric film is formed on both the positive electrode foil and the negative electrode foil can be cited.

The electrode foil 1 is made of a valve metal such as aluminum, tantalum, titanium, niobium, niobium oxide, and the like. Purity is desirably about 99.9% or more for the positive electrode foil and is desirably about 99% or more for the negative electrode foil, however, impurities such as silicon, iron, copper, magnesium, and zinc may be contained. As shown in FIG. 1, the electrode foil 1 is in a long length, surface enlarged parts 3 are formed on both sides, leaving a core part 2 at a center in a thickness direction, a plurality of separation parts 4 are formed on one side or both sides of the surface enlarged parts 3, and the dielectric film 5 is formed on the surface of the surface enlarged parts 3 and the separation parts 4.

The surface enlarged parts 3 has a porous structure. The porous structure is composed of tunnel-shaped pits. Typically, the surface enlarged parts 3 is formed by direct current etching in which a direct current is applied in an acidic aqueous solution containing halogen ions such as hydrochloric acid.

The electrode foils 1 include an electrode foil for a high voltage. In addition, the remaining part other than the surface enlarged parts 3 of the valve metal corresponds to the core part 2. In other words, for example, an unetched layer corresponds to the core part 2. However, it is not necessary to understand the core part 2 as a layer where all of the tunnel-shaped pits are unreached. Majority of the tunnel-shaped pits may be unreached to the layer. In other words, some tunnel-shaped pits may penetrate the core part 2. The thicknesses of the surface enlarged parts 3 and the core part 2 are not particularly limited, however, it is preferable that the thickness of the surface enlarged parts 3 on both sides is in a range of 40 to 200 μm as a whole and it is preferable that the thickness of the core part 2 is in a range of 8 to 60 μm.

The separation part 4 divides the surface enlarged parts 3 in a depth direction from the surface of the electrode foil 1 toward the core part 2. The separation part 4 may have any depths including a depth which the deepest part does not reach the core part 2, a depth which the deepest part just reaches the core part 2, and a depth which the deepest part breaks into the core part 2, as long as the separation part 4 does not completely divide the core part 2. In addition, the depths of all the separation parts 4 do not have to be the same.

In detail, the separation parts 4 extends discontinuously and partially across the electrode foil 1. The separation part 4 connects a plurality of tunnel-shaped pits constituting the surface enlarged part 3 or strides a plurality of tunnel-shaped pits. The position, length, and extension direction of each separation part 4 are different, and may be a belt longitudinal direction or a width direction of the electrode foil 1, and they may be mixed and extended in a random orientation. Moreover, the linear or curvilinear separation parts 4 may be mixed, and the separation part 4 may be branched halfway or may be a single line. The separation distance between both ends of one separation part 4 is 40 µm or more and 150 µm or less on average, and about 10 µm for a shorter one and about 600 µm for a longer one. The flexibility and the stretchability of the electrode foil 1 are improved by the separation part 4 having a length in this range.

The separation parts 4 are formed by cracking the surface enlarged parts 3, splitting the surface enlarged parts 3, notching the surface enlarged parts 3 in the thickness direction of the electrode foil 1, cutting out the surface enlarged parts 3, or digging the surface enlarged parts 3 in the thickness direction of the electrode foil 1. Therefore, examples of the actual state of the separation parts 4 include cracks, splits, notches, cutouts, or diggings. However, the form of the separation parts 4 is not particularly limited as long as the surface enlarged parts 3 are divided.

Groove width of the separation part 4 is from 0 to 50 µm on the condition the electrode foil 1 is flattened without being curved. The groove width of the separation part 4 is a length in the longitudinal direction of the electrode foil 1 measured in the vicinity of a surface layer of the electrode foil 1. When the separation part 4 is formed by cracking, splitting, or notching, the groove width of the separation part 4 is substantially zero. Substantially zero refers to a state which interfaces of the separation parts 4 are at least partially in contact with each other when the electrode foil 1 is flattened without being bent. When the groove width of the separation part 4 is 50 µm or less, a large decrease in electrostatic capacitance of the winding capacitor due to a decrease in surface area of the dielectric coating film 5 can be prevented without the deterioration of the flexibility and stretchability of the electrode foil 1.

Here, as a formation method of the separation parts 4, for example, a physical method such as pushing the electrode foil 1 on a round bar, may be considered. In a formation method using a round bar, the core part 2 of the electrode foil 1 extends in the longitudinal direction, and as a result, the thickness of the core part 2 becomes thin. However, the thickness of the core part 2 is unlikely to be reduced when the groove width of the separation part 4 is 50 µm or less, and the flexibility and stretchability of the electrode foil 1 are improved. In this respect, the groove width of the separation parts 4 is preferably 50 µm or less.

The separation parts 4 may be formed with a uniform average pitch or number within a unit range in the longitudinal direction of the electrode foil 1. In addition, the average pitch and number within a unit range may be changed by considering a curvature at the location where the separation parts 4 are formed when the electrode foil 1 is wound. This is because, when the curvature becomes smaller, that is, when it is wound on more outer circumference side during the winding, the bending stress decreases, leading a suppression of cracks during the winding.

For example, the separation parts 4 may be formed only on a part which the winding of the electrode foil 1 to a winding shaft starts. The part which the winding of the electrode foil 1 starts has a large curvature and cracks easily occur. In addition, the average pitch may be set to be larger in proportion to a winding radius at a part where the separation parts 4 are positioned, and the number within a unit range may be reduced in inverse proportion to the radius. As the number of the separation parts 4 decreases, an influence to the electrostatic capacitance of the winding capacitor decreases.

It is desirable that the separation parts 4 are formed each of the surface enlarged part 3 of both sides, however, in consideration of stretching of the electrode foil 1 during the winding, the separation parts 4 may be formed on at least the surface enlarged parts 3 that is on the outer side of the foil when the electrode foil 1 is wound and receives tension.

The dielectric film 5 is formed by chemically treating the surface enlarged parts 3, and typically, an oxide film, which is formed by applying a voltage to a solution without halogen ions such as an aqueous solution of adipic acid, boric acid, or the like, is used.

Here, it is preferable that the dielectric film 5 is also formed on the surface of the groove of the separation parts 4. When the dielectric film 5 is also formed on the surface of the groove of the separation parts 4, it is because, it was found that a quantity of electricity (C) required for an aging treatment to repair the dielectric film 5 decreases.

It is assumed that when the separation parts 4 are formed, since each of the separation parts 4 shares the bending stress, the bending stress is unlikely to be concentrated and the occurrence of fine cracks during the winding is suppressed. When the occurrence of cracks during the winding is suppressed, the unoxidized metal part (aluminum) is unlikely to be exposed from the inner surface of the cracks. That is, when a chemical treatment is performed after the separation parts 4 are formed, the dielectric film 5 is formed also on the inner surface of the separation parts 4, in other words, an unoxidized metal part is not exposed from a inner surface of the separation parts 4, and a quantity of electricity required for an aging treatment decreases.

In addition, when the separation parts 4 are formed before the chemical treatment, a manufacturing process of the electrode foil 1 can be smoothly realized. Therefore, preferably, after the surface enlarged parts 3 are formed, the separation parts 4 are formed before the chemical treatment. In this case, by forming thin oxide before the separation parts 4 are formed, the separation parts 4 are easily formed.

It should be noted that, even when the separation parts 4 are formed after the chemical treatment, a stress dispersion effect by the separation parts 4 during the winding can be obtained. In addition, by performing the chemical treatment before the separation parts 4 are formed and performing the chemical treatment again after the separation parts 4 are formed, the dielectric coating film 5 can be formed on the surface of the separation parts 4.

Winding Capacitor

Figure 2:
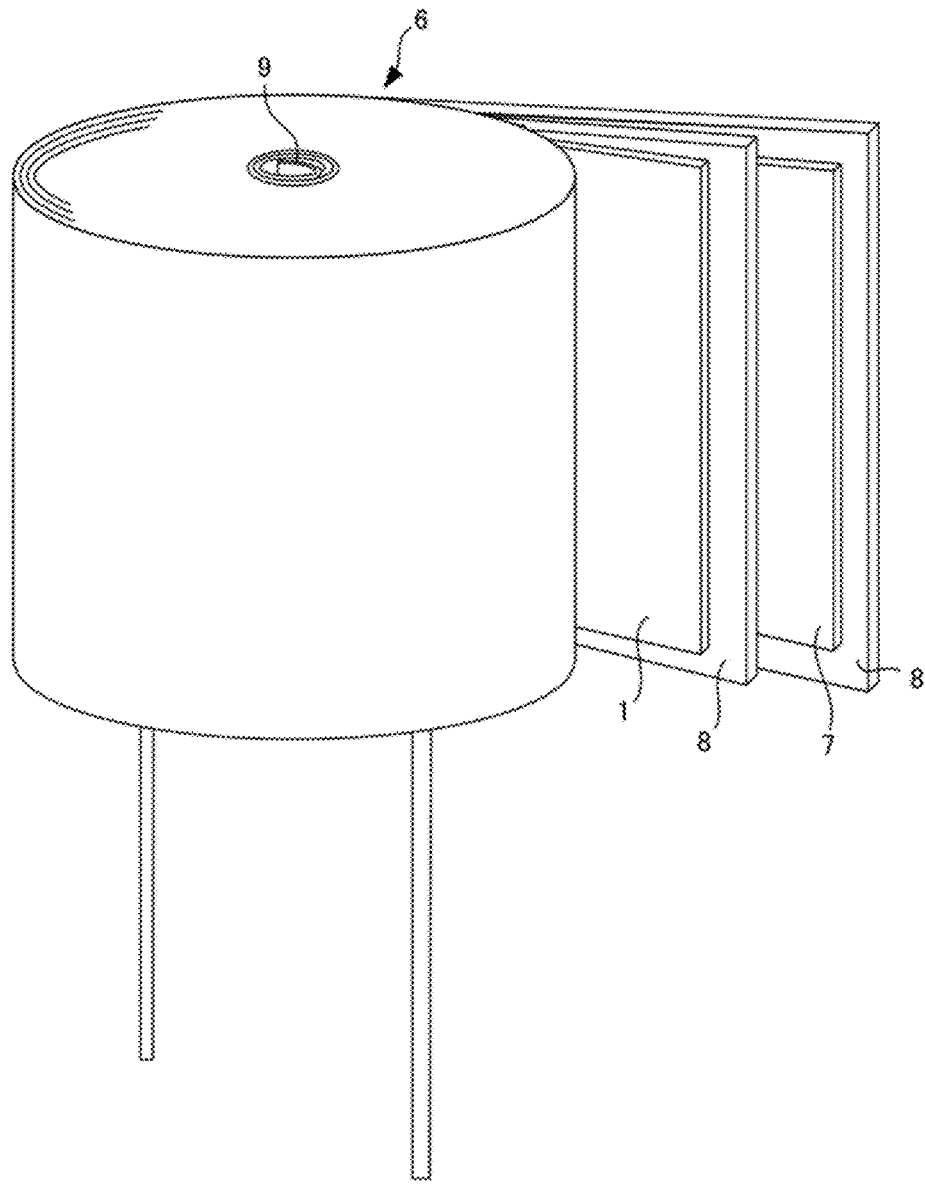
FIG. 2 is a perspective view showing a capacitor element included in a winding capacitor according to the present embodiment.

FIG. 2 is a schematic diagram showing a capacitor element 6 of the winding capacitor using the electrode foil 1, and an example of an aluminum electrolytic capacitor. In the capacitor element 6, the electrode foil 1 that is the positive electrode foil and a negative electrode foil 7 are laminated with a separator 8 such as paper or synthetic fibers therebetween. The separator 8 is laminated so that one end thereof protrudes from one end of the electrode foil 1 and the negative electrode foil 7. Then, the protruding separator 8 is wound first to form a winding core part 9, and layers of the electrode foil 1, the negative electrode foil 7, and the separator 8 are subsequently wound around the winding core part 9 that is a winding shaft.

Figure 3:
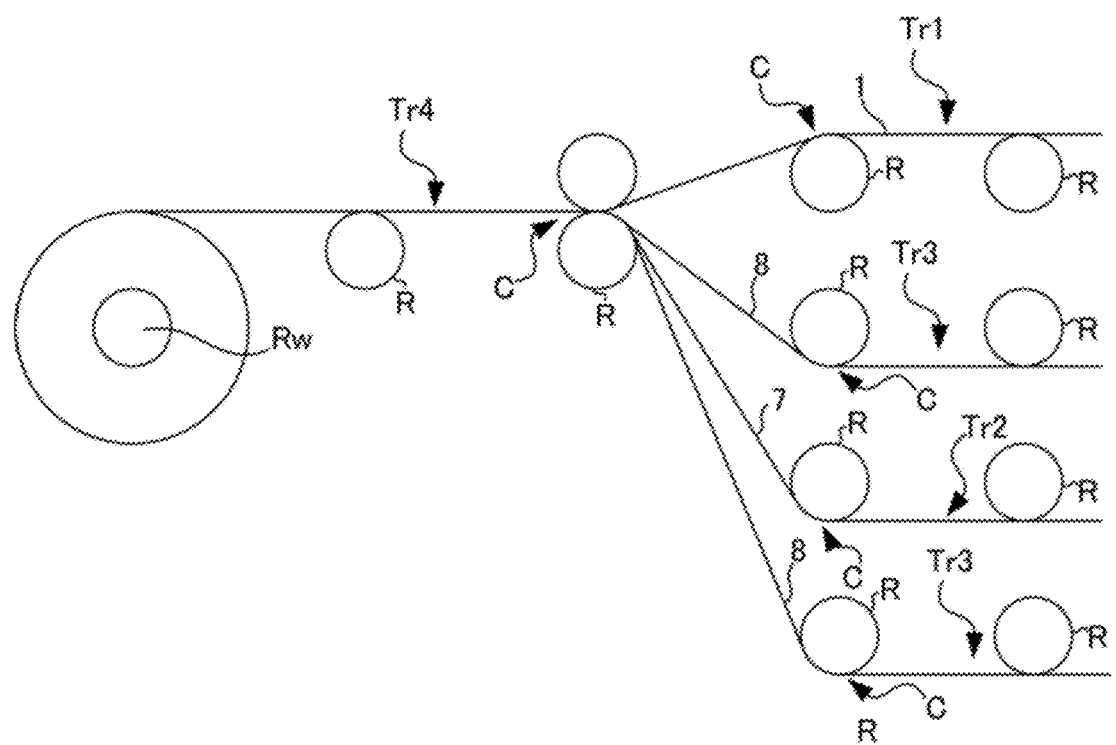
FIG. 3 is a schematic configuration diagram of a transfer device.

A process of laminating the electrode foil 1 that is the positive electrode foil, the negative electrode 7, and the separator 8, and a process of winding the electrode foil 1, the negative foil 7, and the separator 8 are performed typically by a transfer device provided with a plurality of rollers. As shown in FIG. 3, for example, this transfer device is provided with four individual transfer paths Tr1, Tr2 and Tr3, and one collective transfer path Tr4 in which four transfer paths are collected.

The individual transfer paths Tr1, Tr2 and Tr3 and the collective transfer path Tr4 are formed by a plurality of rollers R. The four individual transfer paths Tr1, Tr2 and Tr3 run the electrode foil 1 that is the positive electrode foil, the negative electrode foil 7, and a separator 8, respectively. All of the electrode foil 1, the negative electrode foil 7 and the separator 8 traveling on the individual transfer paths Tr1, Tr2 and Tr3 are applied to the leading roller R of the collective transfer path Tr4, and the electrode foil 1, the negative electrode foil, and the separator 8 are laminated at the beginning of the collective transfer path Tr4.

The individual transfer paths Tr1, Tr2, and Tr3 and the collective transfer path Tr4 have a plurality of bending points C from the viewpoint of downsizing of the transfer device. In the roller R at the bending point C, the electrode foil 1, the negative electrode foil 7, and the separator 8 are bent along the roller R at the bending point C so as to change the traveling direction. Further, the transfer device includes a winding roller Rw at the end of the collective transfer path Tr4. The winding roller Rw rolls the laminated electrode foil 1, negative foil 7, and separator 8 by axial rotation, and wind them.

In a case of producing an electrolytic capacitor, the capacitor element 6 formed in this manner is impregnated with an electrolyte solution, housed in an exterior case with a cylindrical shape and a bottom, a positive electrode terminal and a negative electrode terminal are drawn out and sealed with a sealing material, and an aging treatment is performed, so as to obtain a form of a winding capacitor. In addition, in a case of producing a solid electrolytic capacitor, the capacitor element 6 formed in this manner is subjected to an aging treatment, an electrolyte is then formed, housed in an exterior case with a cylindrical shape and a bottom, and a positive electrode terminal and a negative electrode terminal are drawn out and sealed with a sealing material, so as to obtain a form of a winding capacitor.

Figure 4:
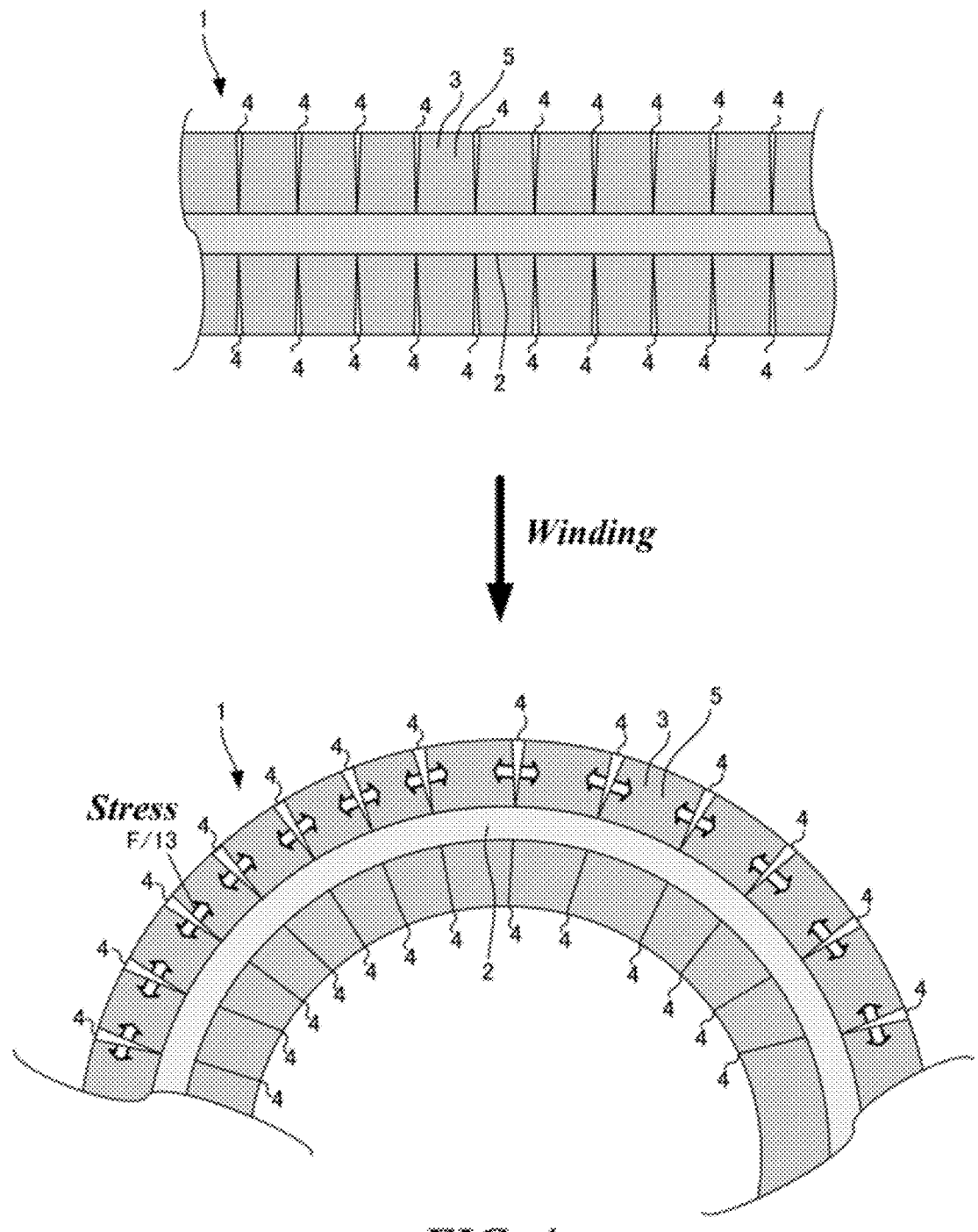
FIG. 4 is a cross-sectional view in a longitudinal direction of an electrode foil including separation parts according to the present embodiment.

FIG. 4 is a schematic diagram showing a state of the electrode foil 1 wound around the capacitor element 6. In the electrode foil 1 of the present embodiment, the plurality of the separation parts 4 share and receive the bending stress, and the bending stress disperses in each of the separation parts 4. Therefore, new fine cracks hardly occur on the surface enlarged parts 3, and a stress that may break the core part 2 is prevented from being applied to the electrode foil 1, breaking of the core part 2 is avoided, and the electrode foil 1 is wound with a smooth curve without being bent. That is, at the time of winding, it is possible to suppress the occurrence of cracks that expose the unoxidized metal part.

Also, although the roller R at the bending point C bends the electrode foil 1 when the roller transfer by the transfer device is performed, the plurality of separation parts 4 of the electrode foil 1 share and receive the bending stress, and bending of the electrode foil 1 is suppressed.

EXAMPLE 1

The electrode foil 1 shown in this embodiment was produced as follows. First, an aluminum foil with a thickness of 130 µm, a width of 10 mm, a length of 55 mm, and a purity of 98 weight % or more was used as a substrate. Then, the surface enlarged parts 3 composed of tunnel-shaped pits for medium and high pressure were formed on both sides of the aluminum foil. Specifically, using a first step of forming pits and a second step of enlarging the pits, an etching process was performed on the aluminum foil electrochemically at a direct current in an aqueous solution containing chlorine ions in the first step. In the etching process in the first step was performed for about 1 minute at a current density of 400 mA/cm$^2$. In the second step, in order to enlarge the pits formed on the aluminum foil subjected to the first step, the etching process was performed electrochemically with direct current in an aqueous solution containing nitrate ions. The etching in the second step was performed for about 2 minutes at a current density of 300 mA/cm$^2$.

After the etching process, the separation parts 4 were formed on the aluminum foil of which both sides had been etched. The separation parts 4 were formed to be orthogonal to a belt longitudinal direction of the aluminum foil. Specifically, as a physical processing method, the aluminum foil was pushed to a round bar of φ4 mm with a wrap angle indicating a size of an area which the round bar and the aluminum foil is in contact set to 180 degrees, to form the separation parts 4.

In addition, after the separation parts 4 were formed, the chemical treatment was performed, and the dielectric film 5 was formed on the surface of the surface enlarged parts 3 and the separation parts 4. Specifically, a voltage of 650 V was applied in chemical treatment solution of 4 weight % of boric acid with a liquid temperature of 85° C.

Figure 5:
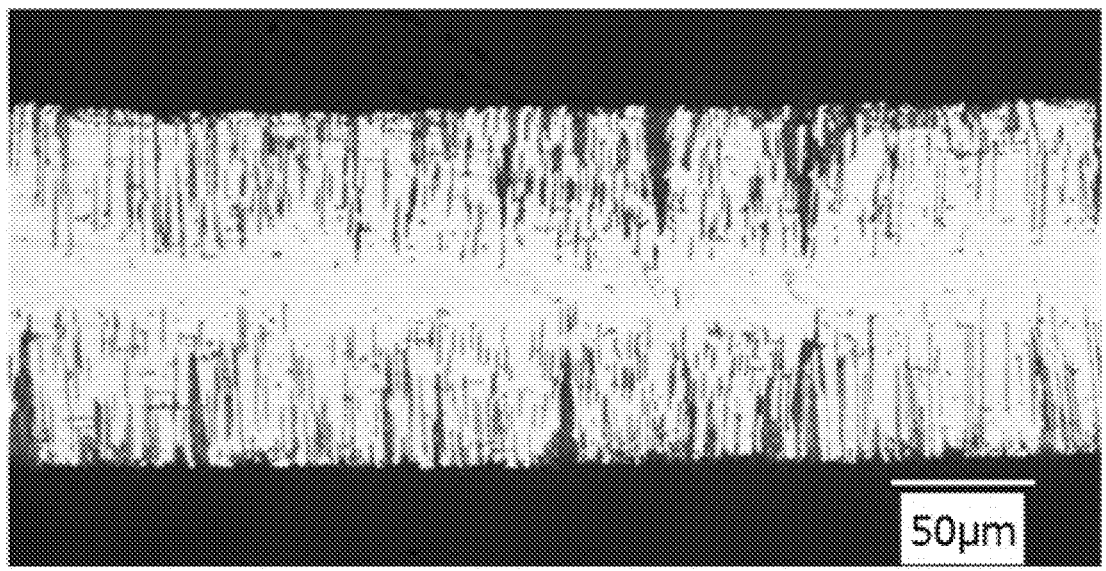
FIG. 5 is a cross sectional photo in a longitudinal direction of an electrode foil including separation parts according to the present embodiment according to Example 1.
Figure 6:
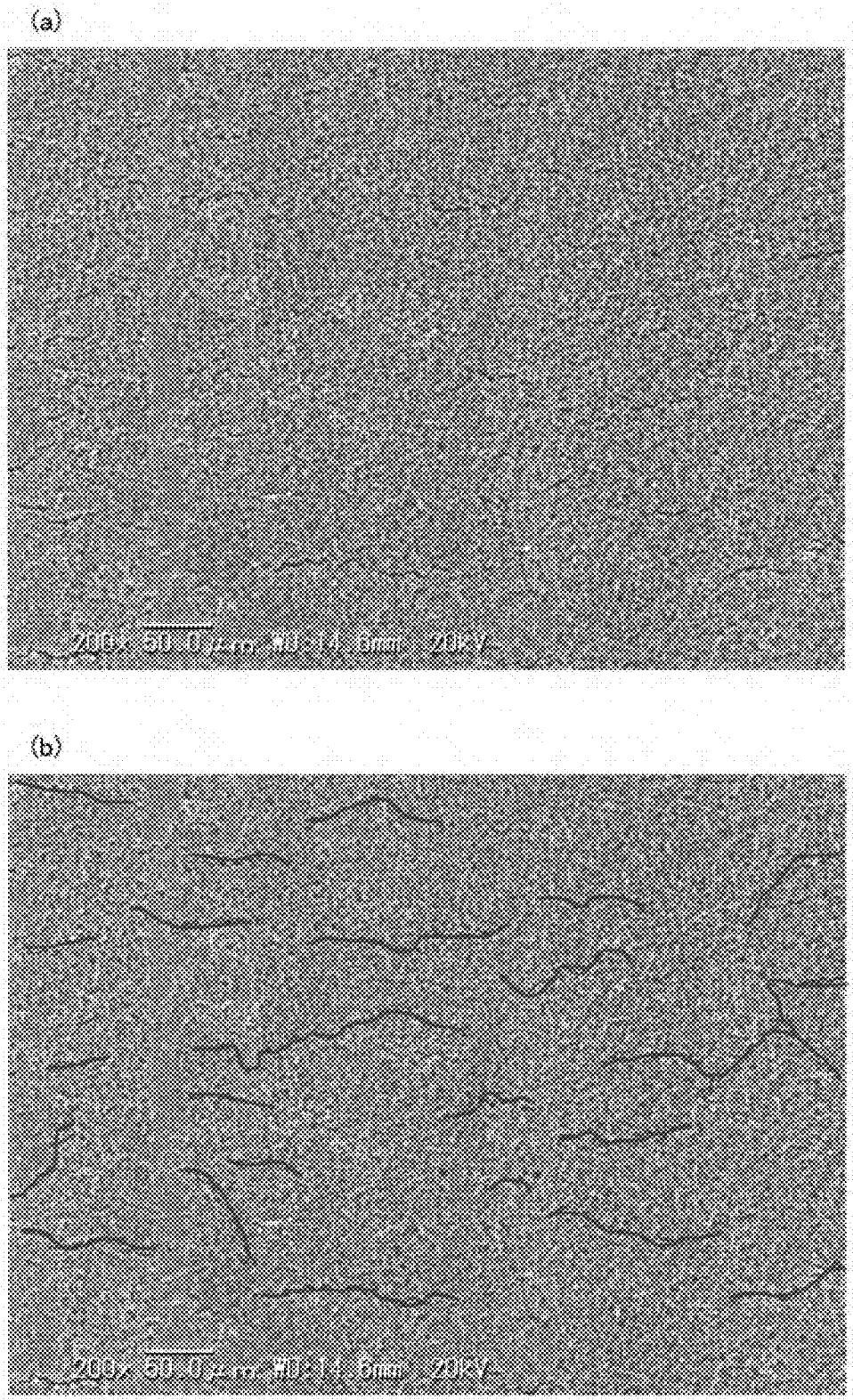
FIG. 6 is a photo showing a surface of an electrode foil including separation parts of the present embodiment according to Example 1, in which a direction on the long side of the photo is a width direction of the electrode foil and a direction on the short side of the photo is a longitudinal direction of the electrode foil.

FIG. 5 is a cross-sectional photo in a longitudinal direction of the electrode foil 1 according to the first embodiment. Moreover, FIG. 6(a) is a photo of 200-times SEM observation showing the surface of the electrode foil 1 according to Example 1, in which a direction on the long side of the photo is a width direction of the electrode foil and a direction on the short side of the photo is a longitudinal direction of the electrode foil. FIG. 6(b) is obtained by performing digital processing for emphasizing the separation parts appearing in the photo of FIG. 6(a). As shown in FIGS. 5 and 6(a) and (b), in the electrode foil 1 of Example 1, twenty-four separation parts 4 were observed within a range of 10 mm×10 mm observation area. From the photo of the 200-times SEM observation, when ten separation parts 4 were arbitrarily selected, the average separation distance between both ends of the selected separation parts 4 was about 120 µm. The separation distance between the both ends was about 40 µm for shorter one and about 250 µm for a long one. In addition, in the electrode foil 1 of this Example 1, the surface enlarged part 3 having the dielectric film 5 was present on both sides of the core part 2 with a thickness of 55 µm, and the thickness of the core part 2 was 10 µm.

Comparative Example 1

Figure 7:
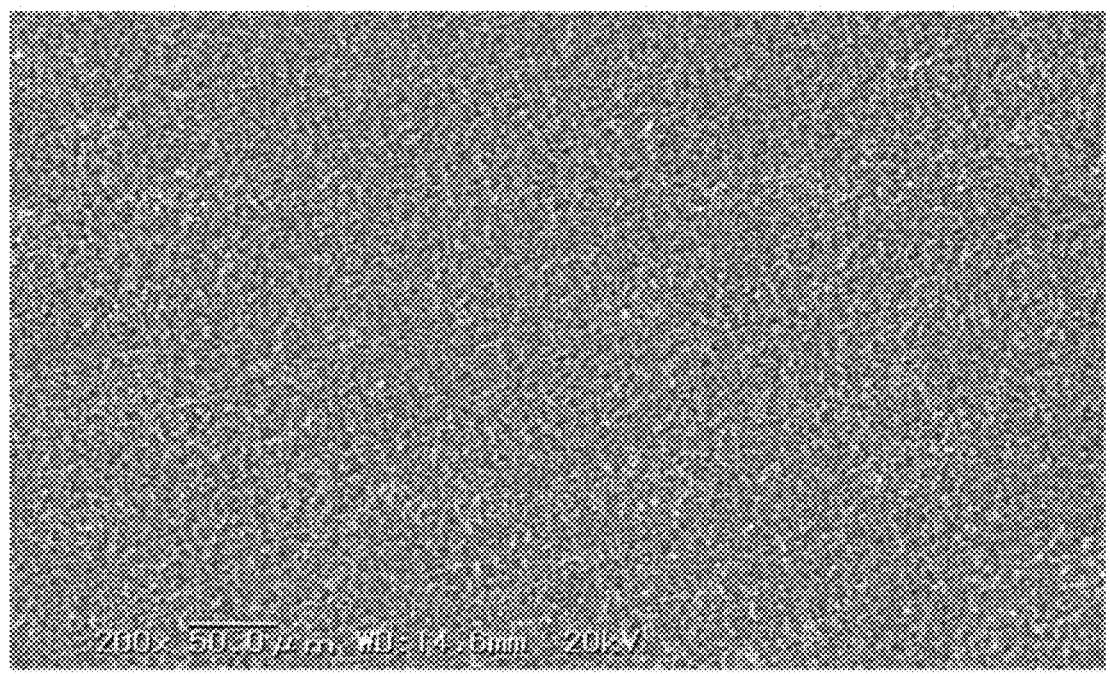
FIG. 7 is a photo showing a surface of an electrode foil according to Comparative Example 1, in which a direction on the long side of the photo is a width direction of the electrode foil and a direction on the short side of the photo is a longitudinal direction of the electrode foil.

The same substrate as Example 1 was used, and the same etching process and chemical treatment as Example 1 were performed. However, the process of forming the separation parts 4 was omitted and no separation parts 4 were formed. FIG. 7 is a photo of 200-times SEM observation showing the surface of an electrode foil according to Comparative Example 1, in which a direction on the long side of the photo is a width direction of the electrode foil and a direction on the short side of the photo is a longitudinal direction of the electrode foil.

As shown in FIG. 7, same as Example 1, an electrode foil of Comparative Example 1 had the surface enlarged parts 3 on both sides of the core part 2, the surface enlarged parts 3 has the dielectric film 5, the thickness of each of the surface enlarged parts 3 having the dielectric film 5 was 55 µm, and the thickness of the core part 2 was 10 µm. However, even with 200-times SEM observation, a line connecting adjacent tunnel-shaped pits was not observed on the surface of the electrode foil. That is, the separation part 4 was not formed.

In addition, in order to make the state of the separation part 4 more legible, a surface treatment may be performed on the electrode foil 1. For example, P—Cr treatment may be listed. Specifically, by immersing the electrode foil 1 in an aqueous solution of chromic anhydride (21 g/L) and phosphoric acid (53 g/L) at a liquid temperature of 85° C. for about 1 hour, fine oxides on the surface of the electrode foil are removed, and the observation of the separation parts 4 is facilitated. However, in Comparative Example 1, a line connecting adjacent tunnel-like pits was not observed on the surface of the electrode foil even when the electrode foil was subjected to P—Cr treatment.

Erichsen Test

An Erichsen test was performed on the electrode foils 1 of Example 1 and the electrode foil of Comparative Example 1. In the Erichsen test, the electrode foils 1 of Example 1 and the electrode foil of Comparative Example 1 were sandwiched between a die holder with an inner diameter of 33 mm and a blank holder at 10 kN, and pushed with a punch having a chisel shape. The chisel-shaped punch had a width of 30 mm and a tip part that is a spherical surface of φ4 mm in a cross-sectional view. A chisel part of the punch was pushed in a direction orthogonal to the belt longitudinal direction of the electrode foil 1. A pushing speed of the punch was 0.5 mm/min.

Figure 8:
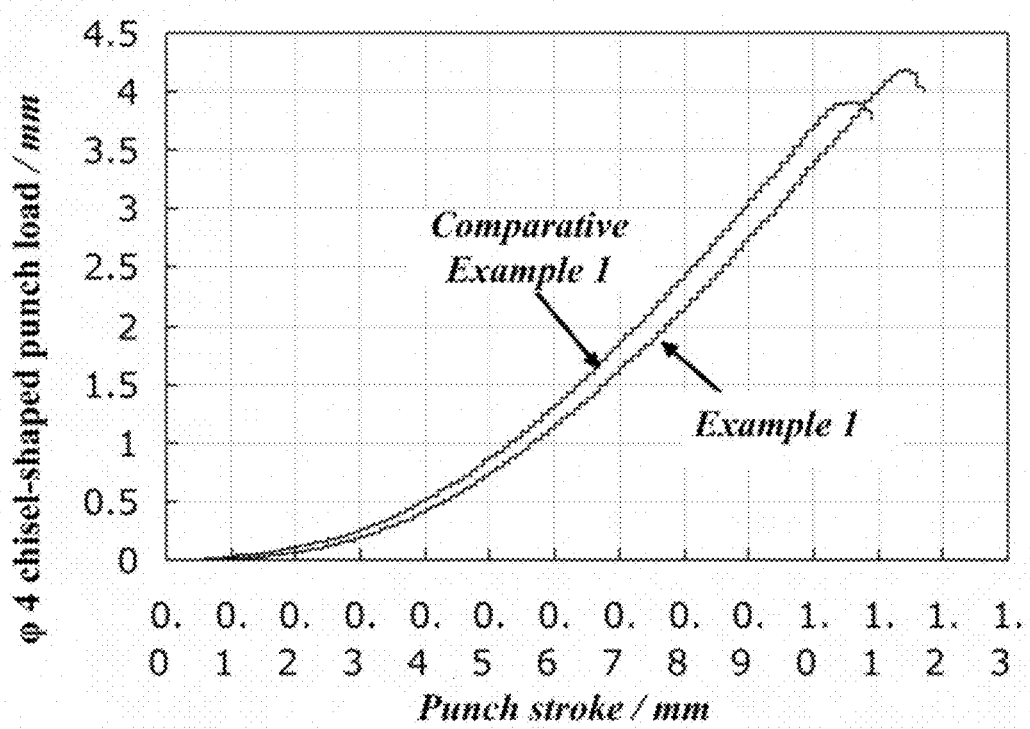
FIG. 8 is a graph showing Erichsen test results of Example 1 and Comparative Example 1.

The results of the Erichsen test are shown in FIG. 8. FIG. 8 is a graph in which the horizontal axis is a punch stroke and the vertical axis is a punch load. The punch stroke is the distance that the punch is pushed in, and the punch load is the load required to achieve each punch stroke. As shown in FIG. 8, while the electrode foil of Comparative Example 1 was torn before the punch stroke reached 1.1 mm, the electrode foil 1 of Example 1 had a punch stroke beyond 1.1 mm before being torn. That is, in the electrode foil 1 of Example 1, the stretchability is improved by providing the separation parts 4.

Further, as shown in FIG. 8, for the electrode foil of Comparative Example 1, for example, a load of 1.8 N was required. to make the punch stroke 0.7 mm, however the electrode foil 1 of Example 1 achieved a punch stroke of 0.7 mm with a load of 1.6 N. That is, in the electrode foil 1 of Example 1, the flexibility is improved by about 11% by providing the separation parts 4. That is, it was confirmed that Example 1 in which the stretchability and the flexibility were improved was less likely to generate cracks at the time of winding and was less likely to expose the unoxidized metal portion, compared with Comparative Example 1.

Aging Evaluation

The electrode foil 1 of Example 1 and the electrode foil of Comparative Example 1 were wound as a positive electrode foil to form the capacitor element 6. The sizes of the electrode foil 1 of Example 1 and the electrode foil of Comparative Example 1 both changed to 50 mm in width and 3300 mm in length. Moreover, the electrode foil 1 of Example 2 which uses the same base material as Example 1, and is subjected to the same etching process, formation process of the separation parts 4, and chemical treatment as Example 1, was prepared. However, the electrode foil 1 of Example 2 before forming the capacitor element 6 is subjected to the treatments in the order of etching treatment, chemical treatment, and forming treatment of the separation parts 4, and the dielectric film 5 is not formed on the surface of the separation parts 4. An aluminum foil was used as the negative electrode foil 7. The surface enlarged parts 3 were formed on the negative electrode foil 7, and the dielectric film 5 was not formed. Cellulose fibers were used for the separator 8.

The capacitor element 6 using the electrode foil 1 of Example 1, the capacitor element 6 using the electrode foil 1 of Example 2, and the capacitor element using the electrode foil of Comparative Example 1 were impregnated with an electrolyte solution, and housed in an exterior case with a cylindrical shape and a bottom, and a positive electrode terminal and a negative electrode terminal were drawn out and sealed with a sealing material. As the electrolyte solution, an ethylene glycol solution of 1-7-octanedicarboxylic acid in which boric acid-mannitol is added was used. Accordingly, the winding capacitor using the electrode foil 1 of Example 1, the winding capacitor using the electrode foil 1 of Example 2, and the winding capacitor using the electrode foil of Comparative Example 1 were produced.

Figure 9:
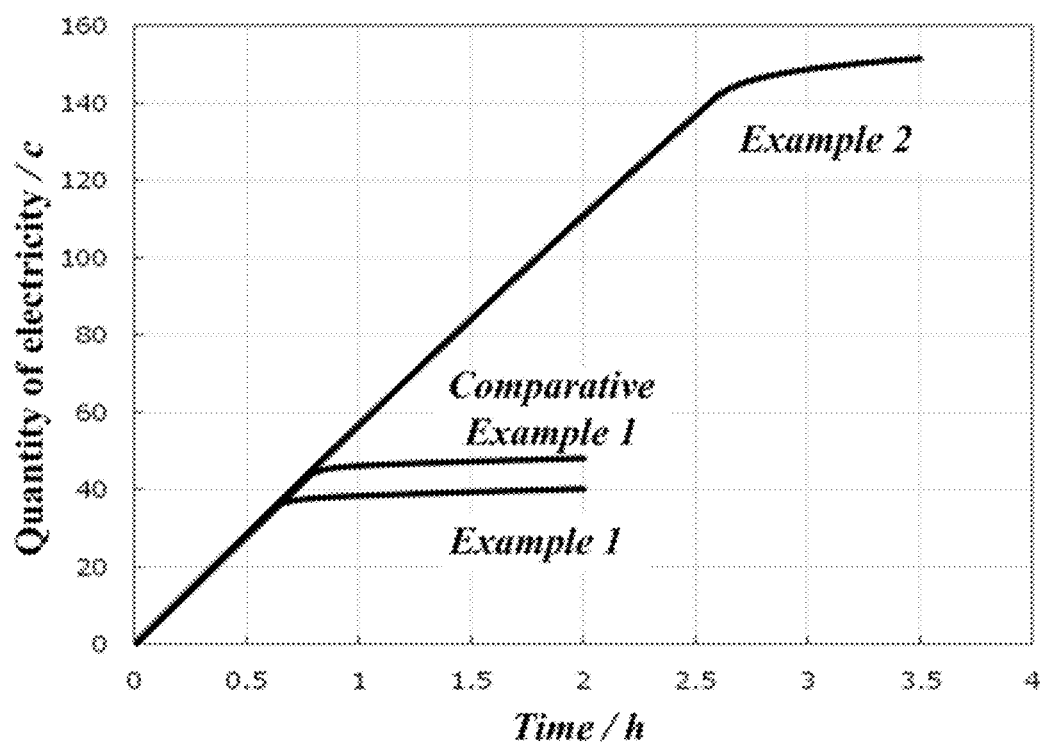
FIG. 9 is a graph showing integrated values of quantity of electricity in an aging treatment of a winding capacitor.

Both of the produced winding capacitors were subjected to an aging treatment, and a quantity of electricity required for the aging treatment was measured. This aging treatment also serves as a chemical treatment for the electrode foil 1 of Example 2, and the dielectric film 5 is formed on the electrode foil 1 of Example 2 by this aging treatment. The aging treatment was performed by applying a rated voltage under a temperature condition of 100 20 C. During the aging treatment, a temporal change in current flowing between the positive electrode terminal and the negative electrode terminal was measured. Note that, a current value flown in the three winding capacitors when the aging treatment started were the same. FIG. 9 is a graph showing integrated values of quantity of electricity from the start of the aging treatment.

As shown in FIG. 9, in the winding capacitor using the electrode foil 1 of Example 1, the current leveled off at around 36 minutes. On the other hand, in the winding capacitor using the electrode foil of Comparative Example 1, the current leveled off at around 48 minutes. Also, in the winding capacitor using the electrode foil 1 of Example 2, the current leveled off at around 131 minutes. That is, in the winding capacitor using the electrode foil 1 of Example 1, since the separation parts 4 are formed in the electrode foil 1, compared to the wound capacitor using the electrode foil of Comparative Example 1, it is shown that the time required for the aging treatment was dramatically shortened and the quantity of electricity is reduced. In addition, in the winding capacitor using the electrode foil 1 of Example 1, since the dielectric film 5 is formed on the surfaces of the surface enlarged parts 3 and the separation parts 4 before being incorporated into the winding capacitor, compared with the winding capacitor using the electrode foil of Example 2, it is shown that the time required for the aging treatment is dramatically shortened and the quantity of electricity is reduced.

REFERENCE SIGNS LIST

1 Electrode foil
2 Core part
3 Surface enlarged part
4 Separation part
5 Dielectric coating film
6 Capacitor element
7 Negative electrode foil
8 Separator
9 Winding core part

The invention claimed is:

1. An electrode foil, which is made of a belt-like foil, comprising:
   surface enlarged parts that are formed on a surface of the foil and are formed of a plurality of tunnel-shaped pits;
   a core part which is a part remained when excluding the surface enlarged parts within the foil;
   a plurality of separation parts that extends discontinuously on the surface enlarged parts, and divides the surface enlarged parts; and
   a dielectric film formed on surfaces of the surface enlarged parts or on surfaces of the surface enlarged part and the separation parts,
   wherein the separation parts are cracks, splits, notches, cutouts, or diggings with a groove width of 0 to 50 μm in the condition the foil is flat.

2. The according to claim 1, wherein the separation parts are formed to connect or stride at least the plurality of the tunnel-shaped pits.

3. The electrode foil according to claim 1, wherein a part of pits among the plurality of the tunnel-shaped pits penetrates the core part.

4. A winding capacitor comprising the electrode foil according to claim 1 in a wound state.

5. The winding capacitor according to claim 4, comprising a capacitor element obtained by winding the electrode foil,
   wherein the capacitor element includes a winding core part at the winding center,
   the electrode foil is wound around the winding core part, and
   the separation parts are formed at least on within a predetermined radius of the winding center-side including a start of the winding to the winding core part.

6. An electrode foil manufacturing method, comprising:
   a step of forming surface enlarged parts formed of a plurality of tunnel-shaped pits on a surface of a belt-like foil;
   a step of forming a plurality of separation parts that divide the surface enlarged parts extending discontinuously on the foil, the separation parts being cracks, splits, notches, cutouts, or diggings with a groove width of 0 to 50 μm in the condition the foil is flat; and
   a step of performing a chemical treatment for the foil to form a dielectric film on surfaces of the surface enlarged part or on surfaces of the surface enlarged part and the separation parts.

7. The electrode foil manufacturing method according to claim 6, wherein the chemical treatment is performed for the foil after forming the separation parts.

8. The electrode foil manufacturing method according to claim 6, wherein the chemical treatment is performed for the foil after forming the surface enlarged parts and before forming the separation parts.

9. The electrode foil manufacturing method according to claim 8, further comprising
   a step of performing a chemical treatment again for the foil after forming of the separation parts.

10. A winding capacitor manufacturing method comprising:
    an element forming step of forming a capacitor element by winding the electrode foil obtained by the manufacturing method according to claim 6;
    an electrolyte forming step of forming an electrolyte on the capacitor element; and
    an aging step of aging the capacitor element,
    wherein the aging step is performed after the electrolyte is formed in the electrolyte forming step, or the electrolyte is formed in the aged capacitor element in the electrolyte forming step after the aging step.

* * * * *